United States Patent [19]

Kurita et al.

[11] Patent Number: 4,699,584
[45] Date of Patent: Oct. 13, 1987

[54] DIE OPENING DEVICE FOR MOLDING MACHINE

[75] Inventors: Toshinori Kurita; Hidetoshi Nagamatsu, both of Aichi, Japan

[73] Assignee: Toyoda Gosei Co., Ltd., Nishikasugai, Japan

[21] Appl. No.: 909,290

[22] Filed: Sep. 19, 1986

[30] Foreign Application Priority Data

Sep. 20, 1985 [JP] Japan .................................. 60-209605

[51] Int. Cl.⁴ ........................ B29C 45/64; B29C 45/66
[52] U.S. Cl. .................................. 425/450.1; 425/454; 425/589; 249/162
[58] Field of Search .................. 425/38, 450.1, 188, 425/451.9, 589, 182, 190, 406, 422, 439, 592, 150, DIG. 221, 454; 100/233; 164/339, 342, 343; 249/161, 162

[56] References Cited

U.S. PATENT DOCUMENTS

| | | | |
|---|---|---|---|
| 3,123,857 | 3/1964 | Wacker | 264/71 |
| 3,981,671 | 9/1976 | Edwards | 425/450.1 |
| 4,009,983 | 3/1977 | Jacobs | 425/451.2 |
| 4,013,392 | 3/1977 | Smith | 425/157 |
| 4,069,948 | 1/1978 | Saaty et al. | 222/134 |
| 4,191,523 | 3/1980 | Niederst et al. | 425/589 |

Primary Examiner—Willard E. Hoag
Assistant Examiner—Timothy W. Heitbrink
Attorney, Agent, or Firm—Cushman, Darby & Cushman

[57] ABSTRACT

This invention discloses a die opening device for a molding machine. One upper die segment is attached to the underside of an upper die plate tiltable relative to the surface of a floor on which the molding machine is installed and, at the same time, one lower die segment is opposed to the upper die segment and attached to a lower die plate adapted to be reciprocated vertically in a substantially perpendicular direction by a hydraulic cylinder. The upper die plate and the lower die plate are cooperatively connected to each other with connection means in such a manner that a descent of the lower die plate will tilt the upper die plate and raise the worker side thereof. Owing to the inclination thus produced, the molding groove in the upper die segment is opposed to the worker.

15 Claims, 5 Drawing Figures

DIE OPENING DEVICE FOR MOLDING MACHINE

FIELD OF THE INVENTION

This invention relates to a die closing device for a molding machine which performs the work as injection molding of shaped articles of resin or rubber with the aid of a die such as the die for injection molding to be incorporated in the molding machine.

DESCRIPTION OF THE RELATED ART

In the various dies which are used in forming shaped articles of polyurethane resin, for example, by the injection molding technique, there are included dies of a class consisting of an upper and a lower segment. In a molding machine which is provided with a device for opening and closing a two-segment die, the reaction injection molding of the raw materials for the production of shaped articles of polyurethane resin are effected by means of the two-segment die attached fast to the molding machine preparatorily to the production.

In the aforementioned die, the molding grooves in the upper and lower segments of the die are completely coated with a mold release agent after each shot (each action of injection molding) for the purpose of facilitating the release of the shaped article from the die. This work entails a problem that desired complete and uniform application of the mold release agent to the whole molding grooves is not attained because the work is effected by keeping the die in a slightly opened state and inserting into a narrow space between the upper and lower segments of the die a spray gun for spouting the mold release agent. For the sake of the aforementioned work, therefore, it is highly desirable that the molding groove formed on the inner side of the upper segment of the die should be opposed to the worker operating the molding machine.

In the circumstances, an idea of providing the aforementioned molding machine with an exclusive hydraulic mechanism independently of a hydraulic mechanism used for the die opening mechanism and, while the die is held in an open state, causing the exclusive hydraulic mechanism of the molding machine to tilt the upper segment of the die so as to oppose the inner side thereof to the worker has found acceptance for actual use.

The molding machine which is provided with the aforementioned exclusive hydraulic mechanism, however, poses a problem that it tends to entail mechanical troubles and demands time-consuming maintenance because the addition of the extra hydraulic mechanism compels the machine to occupy an increased space and involve complication of mechanism.

SUMMARY OF THE INVENTION

An object of this invention is to provide a die opening device for a molding machine, which permits compaction of the molding machine itself and, at the same time, enables the mold release agent to be certainly and uniformly applied to the molding grooves of the die, especially the molding groove of the upper segment of the die which has not permitted the spray gun easy access.

Another object of this invention is to provide a die opening device for a molding machine, which facilitates the works of application of the mold release agent, setting of an insert inside the die, and removal of the shaped articles, shortens the time required for each of the works mentioned, and also shortens the time required for the whole molding work in one shot (one action of injection molding).

A further object of this invention is to provide a die opening device for a molding machine, which precludes misalignment between the upper and lower segments of the die during the course of die closure.

Yet another object of this invention is to provide a die opening device for a molding machine, which prevents a main cylinder of the molding machine from concentration of load and enables the main cylinder to enjoy improved durability.

To accomplish the objects described above, this invention aims to provide a die opening device for a molding machine, which comprises one upper die plate tiltable relative to the surface of the floor for installation of the molding machine, one upper die segment attached to the aforementioned upper die plate, one lower die plate opposed to the aforementioned upper die plate and adapted to reciprocate vertically in a substantially perpendicular direction relative to the surface of the floor for installation, one lower die segment attached to the aforementioned lower die plate and opposed to the aforementioned upper die segment, pressure means for vertically reciprocating the aforementioned lower die plate in a substantially perpendicular direction, and connection means for cooperatively connecting the upper die plate and the lower die plate to each other thereby enabling the aforementioned upper die plate to be raised on the worker side thereof in consequence of the vertical reciprocation of the aforementioned lower die plate.

The other objects of this invention will become apparent as the disclosure is made in the following description of preferred embodiments of the invention, as illustrated in the accompanying drawings. Many advantages of this invention unmentioned in the specification will appreciated by persons skilled in the art when they actually work the present invention.

BRIEF DESCRIPTION OF THE DRAWINGS

FIG. 1 representing a front view and FIG. 2 a side view of the device of FIG. 1 in an operating condition.

FIG. 3 representing a partially cutaway front view, FIG. 4 a side view illustrating the die in the process of being closed, and FIG. 5 a side view illustrating the die in the process of being opened.

DESCRIPTION OF THE PREFERRED EMBODIMENTS

Figure 1:
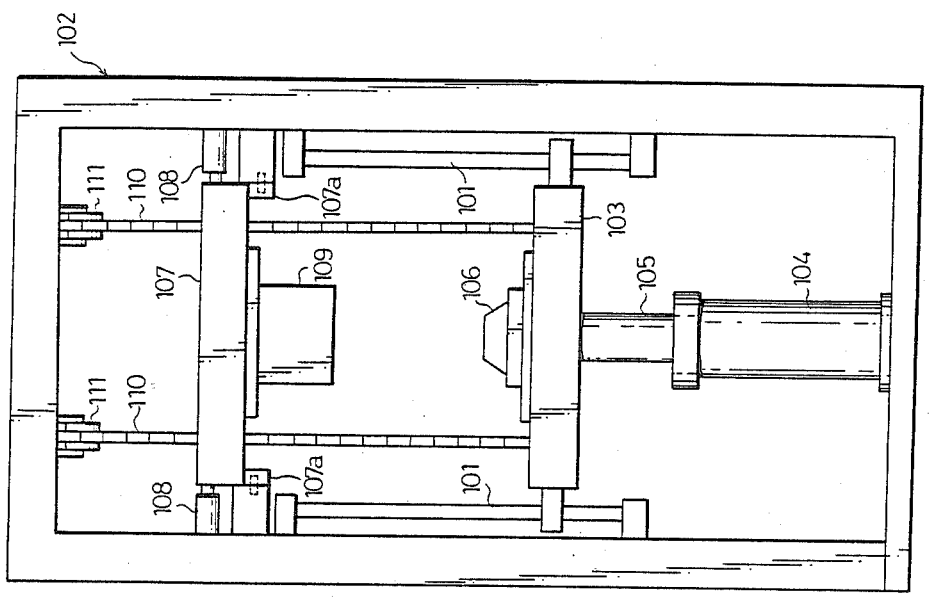
FIGS. 1-2 depict a first working example of this invention embodied in an injection molding machine.

Now, the first working example of this invention as embodied in a chain type die opening device for a molding machine provided with a molding die for forming steering wheels of polyurethane resin will be described below with reference to FIGS. 1-2.

Inside a machine frame 102 which is provided with two tie bars 101, a lower die plate 103 adapted to reciprocate vertically with the aforementioned tie bars 101 as their slide shafts is disposed. To the underside of the die plate 103 is fixed the leading end of a piston 105 of a hydraulic cylinder 104 secured to the aforementioned machine frame 102. By vertically reciprocating the piston 105, the lower die plate 103 is caused to reciprocate vertically in a substantially perpendicular direction along the aforementioned tie bars 101. To the upper side of the aforementioned lower die plate 103 is detachably joined a lower die segment 106 for molding shaped articles.

Above the aforementioned lower die plate 103, an upper die plate 107 is pivotally attached tiltably to the machine frame 102 through the medium of bearing parts 107a disposed on the underside thereof. On the inner lateral walls of the machine frame 102 at the positions opposed to the opposite lateral parts of the forward portion of the aforementioned upper die plate 107, there are disposed locking parts 108 serving to retain the aforementioned upper die plate 107 in a horizontal state at the position indicated in FIGS. 1-2 and prevent the upper die 107 form being rotated downwardly from the aforementioned position. One the underside of the aforementioned upper die plate 107 at the position opposite the aforementioned lower die segment 106, an upper die segment 109 is joined similarly detachably. To the rear portion of the upper side of the aforementioned die plate 107, the leading end of a chain 110 as a connecting member is attached. The basal end of the chain 110 is attached to the aforementioned lower die plate 103 through the medium of a sprocket wheel 111 attached to the machine frame 102 at a position higher than the upper die plate 107. The chain 110, during the course of die closure, is in a loosened state and is incapable of transmitting motive force. During the course of die opening, when the piston 105 is lowered and the lower die plate 103 is simultaneously lowered and eventually brought to the state illustrated in FIGS. 1-2, the chain 110 is stretched taut and enabled to transmit motive force.

Figure 2:
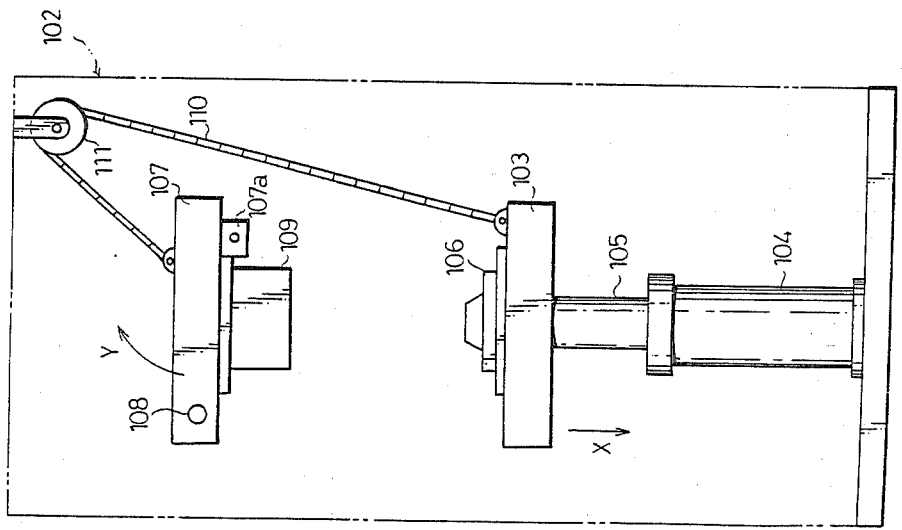

During the course of die opening, when the aforementioned lower die plate 103 is lowered by the aforementioned cylinder 104 and brought to the position shown in FIGS. 1-2 and the chain 110 is consequently stretched taut, the locking part 108 provided in the aforementioned machine frame 102 is released from engagement with the upper die plate 107. When the piston 105 continues its descent from the state shown in FIGS. 1-2 in the direction of the arrow X, the chain 110 connected to the lower die plate 103 is pulled. Owing to the force of this pull, the upper die plate 107 is tilted with the aforementioned bearing parts 107a as fulcrums so that the molding groove on the inner side of the upper die segment 109 will appear on the worker side (on the left side in FIG. 2).

Now, the method for producing a steering wheel 8 using a molding machine provided with the die opening device constructed as illustrated above will be described below together with the operation thereof.

First, inside a cavity to be formed of the molding grooves of the upper die segment 109 and the lower die segment 106, a steering wheel core metal (not shown) is disposed as an insert. Then, the die is closed. Then, a nozzle of a RIM molding machine not shown is applied to the upper die segment 109 and the cavity is filled with polyurethane resin to wrap the periphery of the steering wheel core metal with the polyurethane resin. At this point, the aforementioned chain 110 is in a loosened state.

After the aforementioned polyurethane resin is cured, the die is opened for removal of the shaped article. At this time, the aforementioned molding machine operates as follows.

When the removal of the shaped article is indicated, the hydraulic cylinder 104 is actuated to lower the piston 105. As the result, the aforementioned lower die segment 106 descends in conjunction with the lower die plate 103 disposed on the underside thereof and gradually pulls the chain 110 in a loosened state. When the lower die plate 103 assumes the state shown in FIGS. 1-2 in the process of its descent and the aforementioned chain 110 is consequently stretched fully, the union of the machine frame 102 and the upper die plate 107 in the aforementioned locking part 108 is broken. Then, the aforementioned lower die plate 103 continues its descent and pulls the chain 110, causing the upper die plate 107 to tilt in the direction shown by the arrow Y with the aforementioned bearing parts 107a as fulcrums.

When the aforementioned piston 105 completes its descent and the descent of the lower die plate 103 is ceased, the aforementioned upper die segment 109 is tilted at an angle of about 45 degrees relative to the lower die segment 106 so that the molding groove thereof is directed toward the worker. When the upper die segment 109 is brought to a stop, the steering wheel which has been shaped is removed and, at the same time, the mold release agent is applied to the molding groove of the tilted upper die segment 109 and the molding groove of the lower die segment 106 and a new steering wheel core metal is set in position as an insert in the cavity. Subsequently, the work of die closure is carried out.

During the course of die closure, the lower die plate 103 is raised by actuating the aforementioned hydrauic cylinder 104 consequently elevating the piston 105. In consequence of the elevation of the lower die plate 103, the upper die plate 107 connected to the lower die plate 103 through the medium of the chain 110 begins to rotate gravitationally in a direction opposite the direction of the arrow Y with the aforementioned bearing parts 107a as fulcrums. When the upper die plate 107 is opposed to the aforementioned lower die segment 106 as shown in FIGS. 1-2, it is locked in a horizontal state by the aforementioned locking part 108 and retained parallelly to the lower die segment 106.

Subsequently the aforementioned lower die plate 103 is elevated to join the lower die segment 106 to the aforementioned upper die segment 109.

The molding is continued by repeating the one-shot operation (one action of injection molding).

In accordance with the present working example, since the work of opening and closing the die and the work of tilting the upper die segment 109 for opposing the molding groove on the inner side of the upper die segment 109 to the worker are carried out by one hydraulic mechanism, the molding machine itself is less expensive and more compact than the molding machine using two hydraulic mechanisms. Further, this molding machine has an advantage that the mold release agent can be applied certainly and uniformly even to the molding groove of the upper die segment which has defied approach of the spray gun.

Moreover, owing to the aforementioned tilt produced by the upper die segment 109, the worker is no longer required to take the trouble of inserting the spray gun, for example, into the narrow space between the upper die segment 109 and the lower die segment 106 and applying the mold release agent therein and the work of setting the insert insdie the die and the work of removing the shaped article from the die are greatly facilitated and the time required for each of the works can be notably shortened. As the result, the time required for the whole one-shot molding work (one action of injection molding) can be shortened.

Figures 3, 4:
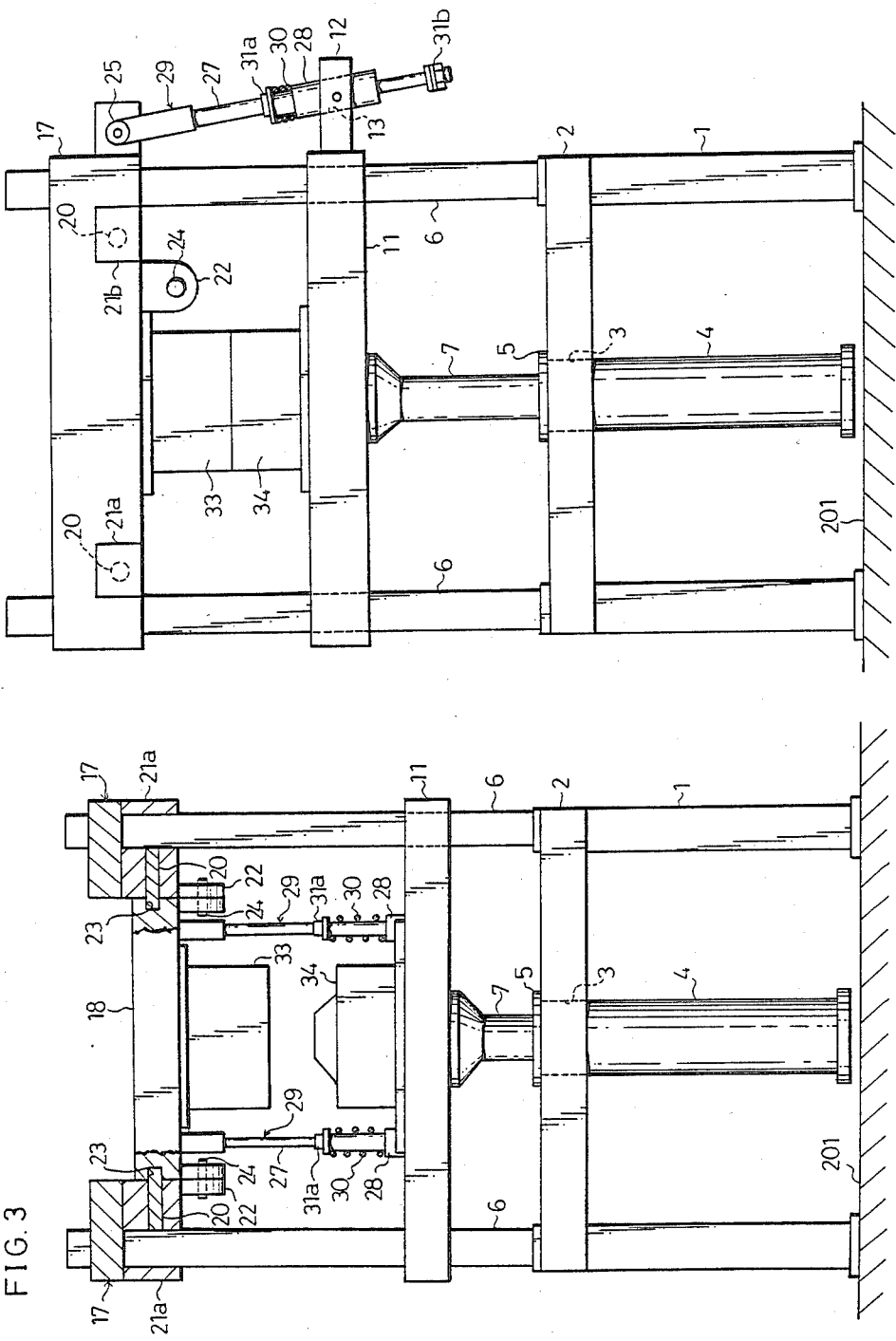
FIGS. 3-5 depict a second working example of this invention.
Figure 5:
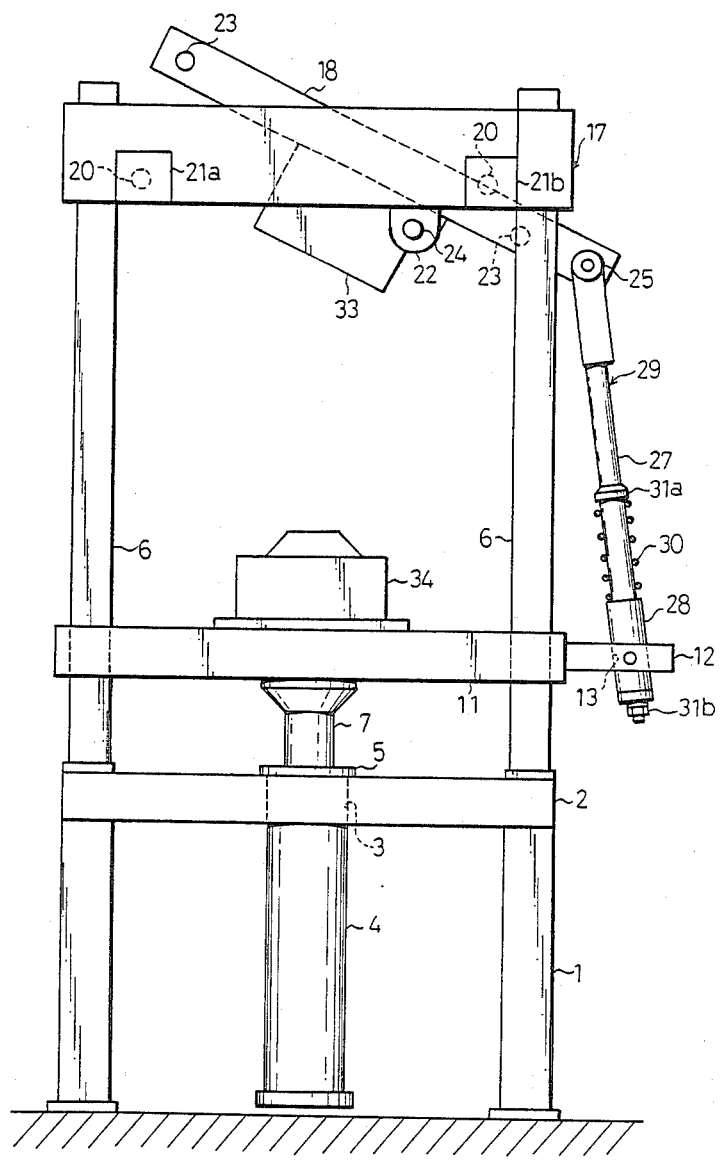

Now a second working example of this invention will be described below with reference to FIGS. 3-5.

This working example is different from the first working examples described above particularly in respect that a link type die opening device is used in the place of the aforementioned chain type die opening device. Now, a molding machine using this die opening device will be described below.

A basement 2 supported on four angular pipe leg parts 1 has a through hole 3 formed substantially at the center thereof. A hydraulic main cylinder 4 is inserted through the through hole 3. It is fastened to the basement 2 by the fact that a flange 5 formed around the upper end of the cylinder 4 is held in fast contact with the upper side of the basement along the edge of the through hole 3. A minor gap is formed between the bottom surface of the cylinder 4 and the floor 201 on which the molding machine is installed. The load exerted upon the aforementioned main cylinder 4, therefore, is supported as apportioned among the four leg parts 1.

At the four corners of the aforementioned basement 2, four tie bars 6 standing upwardly are disposed. Above the aforementioned basement 2, a lower die plate 11 having the leading end of a main piston 7 of the aforementioned main cylinder 4 attached thereto is disposed. The die plate 11 mentioned above is adapted to be vertically reciprocated in a substantially perpendicular direction along the aforementioned tie bars 6. On part of the rear side of the lower die plate 11 (the righthand side in FIG. 4), a projecting part 12 is integrally formed. This projecting part 12 has a through hole 13 formed in one part thereof.

Above the two laterally opposed pairs of tie bars 6, stationary arms 17 are laid so as to connect two longitudinally (the lateral direction in FIG. 4) opposite tie bars 6. Between the two stationary arms 17 mentioned above, an upper die plate 18 is pivotally attached in a rotatable state.

In the front part and the rear part of the lower side of the aforementioned stationary arm 17, a front and a rear locking part 21a, 21b provided each with a rock pin 20 adapted to be retracted as with an air cylinder (not shown) are disposed. Bearing parts 22 are disposed to the rear of the center line of the stationary arms 17 mentioned above.

Further, on the laterally opposite sides of the upper die plate 18 in the parts opposite the locking parts 21a, 21b mentioned above, holes 23 for insertion of the lock pins 20 mentioned abvoe are formed. In the parts opposite the bearing parts 22 mentioned above, rotary pins are disposed one each. The rotary pins 24 are inserted in the aformentioned bearing parts 22. The upper die plate 18 is enabled to be rotated through the medium of the rotary pins 24. When the lock pins are released in the locking parts 21a, 21b mentioned above, the die plate 18 is enabled to tilt with the rotary pins mentioned above as fulcrums.

The upper die plate 18 mentioned above is provided on the laterally opposite sides in the rear portion thereof with bearing parts 25 for attachment of connecting means which will be described more fully afterward. Between the projecting part 12 of the lower die plate 11 and the bearing parts 25, an engaging member 29 consisting of a piston 27 and a cylinder 28 and serving as connecting means is disposed.

The cylinder 28 mentioned above is inserted fast through a through hole 13 formed in the aforementioned projecting part 12. The piston 27 is slidably inserted through the cylinder 28. Further, the upper end of the piston 27 is rotatably attached to the bearing parts 25 mentioned above as shown in FIGS. 4-5. At the substantially central part and the lowermost end part in the direction of length of the piston 27 mentioned above, an upper and a lower engaging steps 31a, 31b are disposed. The cylinder 28 is adapted to be slidably moved as opposed to the piston 27 between the two engaging steps 31a, 31b. Between the lower end of the cylinder 28 and the upper engaging step 31a, a spring 30 for absorbing shocks is disposed around the perphery of the piston 27. The lower part of the spring 30 is inserted into the cylinder 28 and the lower end thereof is fixed at the base of the cylinder 28 and the upper end thereof is held in fast contact with the lower side of the upper engaging step 31b. When the lower die plate 11 is lowered in consequence of the descent of the main piston 7 of the main cylinder 4 during the course of die opening, therefore, the engaging member 29 mentioned above is actuated as follows.

First, the cylinder 28 slides down along the piston 27 until the lower end thereof comes into contact with the upper end surface of the lower engaging step 31b. As the result, a signal to break the union between the locking parts 21a, 21b (the signal transmitting mechanism not shown) is issued so that the lock pin 20 is pulled out of the through hole 23 of the upper die plate 18 and stowed in the locking parts 21a, 21b and the upper die plate 18 is allowed to assume a tiltable state. Subsequently, the upper die plate 18 begins to tilt around the rotary pin 24 as a fulcrum in consequence of the descent of the lower die plate 11. The upper die plate 18 stops its tilting motion when the descent of the lower die plate 11 is brought to a stop. At this point, the upper die plate 18 is locked in its tilted state by a locking mechanism which is not shown in the drawing. The locking mechanism is relieved of its function when the lower die plate 11 is elevated, the cylinder 28 is moved upwardly above the piston 27, and the spring 30 is squeezed to a fixed state. As the result, the upper die plate 18 assumes a tiltable state.

To the upper die plate 18 and the lower die plate 11, an upper die segment 33 and a lower die segment 34 of the die for molding steering wheels are respectively fitted detachably as with bolts similarly to the first working example.

Now, the operation and the effect of the molding machine which is provided with the die opening device constructed as illustrated above will be described below.

The die is closed after a steering wheel core metal (not shown) is set in place as an insert inside a cavity of the die which consists of the upper die segment 38 and the lower die segment 34. Then, a nozzle of a RIM molding machine (not shown) is applied to the upper die segment 33 and the cavity of the die is filled with polyurethane resin so as to wrap the periphery of the steering wheel core metal with the polyurethane resin. At this point, the engaging member 29 is in such a state that the spring 30 inside the cylinder 28 is squeezed to the fullest extent and the cylinder 28 is approximated to the fullest extent to the upper engaging step 31a of the piston 27 as illustrated in FIG. 4.

When the die is opened for removal of the shaped article after the polyurethane resin is cured, the molding machine mentioned above operates as follows.

When an instruction to remove the shaped article is issued, the main piston 7 is lowered and, simultaneously with this descent of the main piston 7, the cylinder 28 of the engaging member 29 slides down along the piston 27 until the lower end side thereof collides against the upper end side of the lower engaging step 31. Then the lock pin 20 is stowed in the locking parts 21a, 21b and the upper die plate 18 is released from its fixed state. Simultaneously with the descent of the lower die plate 11, the upper die plate 18 begins to tilt around the rotary pin 24 as a fulcrum. This tilting motion is ceased at the same time that the main piston 7 is stopped as illustrated in FIG. 5. By this time, a steering wheel of polyurethane resin is completed on the lower die segment 34. In this state, the upper die plate 18 is held fast as tilted at an angle of about 45 degrees relative to the lower die segment 34 so that the molding groove of the upper die plate 18 will be directed forward, namely opposed to the worker. The worker then removes the produced steering wheel out of the die and applies the mold release agent to the molding groove of the upper die segment 33 and the molding groove of the lower die segment 34 and sets a new steering wheel core metal as an insert in the cavity of the die. Then, the molding machine is ready for the work of die closure.

During the course of the die closure, the cylinder 28 slides upwardly above the piston as the lower die plate 11 is elevated simultaneously with the ascent of the main piston 27. The upper die segment 34 is kept locked and prevented from rotating by the locking mechanism mentioned above until the spring 30 inside the cylinder 28 is squeezed by the sliding motion mentioned above. When the lower die plate 11 is elevated further from the aforementioned position, the locking mechanism is relieved of its function and the upper die segment 33 begins to tilt. when the upper die plate 18 assumes a horizontal state as illustrated in FIG. 3 and the through hole 23 of the upper die plate 18 is opposed to the lock pins 20 of the locking parts 21a, 21b, the upper die plate 18 is locked. At this point, the upper die segment 33 and the lower die segment 34 assume a mutually opposed state. As the main piston 7 is further elevated, the upper die segment 33 and the lower die segment 34 in the aforementioned state are brought into tight mutual contact. The impact which is exerted on the upper die segment 33 and the lower die segment 34 at the moment of mutual contact thereof is alleviated by the spring 30. At this time, the aforementioned spring 30 is squeezed to a further extent.

The molding is continued by repeating the one-shot operation described above.

In this working example, similarly to the first working example described previously, the work of die closure and the work of tilting the upper die segment 33 to oppose the molding groove thereof to the worker can be carried out by one hydraulic mechanism. Thus, this working example brings about the same effect as attained by the first working example.

In the present working example, a link mechanism is used in the place of the chain 10 used in the first working example. In the chain type mechanism of the first working example, there is the possibility that, during the course of die closure, there will occur misalignment between the upper die segment 33 and the lower die segment 34. The use of the link mechanism prevents this unwanted phenomenon of misalignment without fail.

The main cylinder 4 is attached to the basement 2 in such a manner that a minor gap will separate this main cylinder 4 from the surface 201 of the floor on which the molding machine is installed. In this arrangement, the load exerted on the main cylinder 4 is dispersed and apportioned to the four leg parts 1, so that the cylinder 4 is prevented from concentration of load. As the result, the main cylinder is allowed to enjoy increased durability.

This invention is not limited to the first and second working examples described above. It can be embodied otherwise as shown below, for example.

(1) The number of engaging members 29 which is two in the second working example may be increased to three or to four, when necessary, to withstand high pressure of die closure or ensure accurate alignment of the two die segments.

(2) The angle of inclination of the upper die segment 33 which is 45 degrees in the second working example may be freely varied depending on the shape of the die or the construction of the molding machine. This variation can be easily obtained by varying the length of the engaging member 29.

(3) The applicability of the die opening device described above is not limited to the RIM molding machine involved in the second working example. This die closing device can be applied to any of the vertical type molding machines which are designed to repeat the molding by the opening and closing motions of the die in the vertical direction.

The present invention is not limited to any specific embodiment. Obviously many modifications and variations of the present invention are possible without departure from the spirit and scope of this invention.

What is claimed is:

1. A die opening device for a molding machine, comprising (a) one upper die plate tiltable relative to the surface of a floor on which said molding machine is installed, (b) one upper die segment attached to said upper die plate, (c) one lower die plate opposed to said upper die plate and adapted to be reciprocated in a substantially perpendicular direction relative to the surface of said floor, (d) one lower die segment attached to said lower die plate and opposed to said upper die segment, (e) pressure means serving to move said lower die plate in a substantially perpendicular direction, and (f) connection means adapted to connect said upper die plate and said lower die plate cooperatively to each other in such a manner that said upper die plate will be raised on a worker side thereof when said lower die plate is lowered.

2. A die opening device according to claim 1, wherein said upper die plate is supported by supporting means, provided on the side opposite a worker, said upper die plate having at least one bearing part, and being pivotally attached to said supporting means through the medium of said bearing part.

3. A die opening device according to claim 2, wherein said connecting means is at least one chain.

4. A die opening device according to claim 3, wherein said supporting means is provided at a position higher than said upper die plate with at least one sprocket wheel and said chain has one end thereof attached to said upper die plate further on the worker side than said bearing part through the medium of said sprocket wheel and the other end thereof attached to said lower die plate.

5. A die opening device according to claim 2, wherein said supporting means is provided on laterally opposite parts of said lower die plate having two perpendicularly extending tie bars and said lower die plate being adapted to move vertically along said tie bar.

6. A die opening device according to claim 5, wherein said supporting means is provided with a pair of locking parts serving to obstruct rotation of said upper die plate while said upper die plate is in a fixed state.

7. A die opening device according to claim 1, wherein said pressure means is a hydraulic cylinder extending in a substantially vertical direction.

8. A die opening device according to claim 7, wherein a piston of said hydraulic cylinder has the leading end thereof attached to said lower die plate.

9. A die opening device according to claim 7, which further comprises a plurality of leg parts, one basement supported by said leg parts and positioned at a level lower than said lower die plate, and one through hole formed substantially at the center of said basement, wherein said cylinder is fixed to said basement by being inserted in said through hole.

10. A die opening device according to claim 9, wherein a minor gap is interposed between the bottom side of said cylinder and the surface of a floor on which said molding machine is installed.

11. A die opening device according to claim 1, wherein said connection means comprises a piston extending perpendicularly in a substantially longitudinal direction and a cylinder.

12. A die opening device according to claim 11, wherein said cylinder is attached to said lower die plate at a part opposite a worker and said piston is inserted through said cylinder in the direction of length thereof and said cylinder has the upper end thereof attached to said upper die plate at a part opposite the worker.

13. A die opening device according to claim 12, wherein an upper engaging step and a lower engaging step are formed respectively on said piston at a substantially middle part of said piston and a lowermost part of said piston in the direction of length of said piston and said cylinder and said piston are adapted to be slidably moved between said two engaging steps.

14. A die opening device according to claim 12, which further comprises four tie bars disposed around said lower die plate in such a manner that said lower die plate will be vertically reciprocated along said tie bars, a pair of stationary arms laid across said tie bars, extending to a side opposite the worker, and disposed parallelly with each other, and wherein said upper die plate is pivotally attached to said stationary arms through the medium of opposite bearing parts provided on said stationary arms at the side nearer a worker than said connection means.

15. A die opening device according to claim 14, wherein locking means is disposed between said supporting means and said upper die plate, said locking means is composed of a plurality of locking parts disposed in a mutually opposed relationship at the opposite ends in the direction of length of said stationary arm, lock pins disposed one each on said locking parts, and through holes formed in said upper die plate at positions opposite said lock pins, wherein said lock pins are inserted into said through holes while said upper die plate is in a fixed state and stowed in said locking parts while said upper die plate is in a tilted state.

* * * * *